Patented Mar. 10, 1936

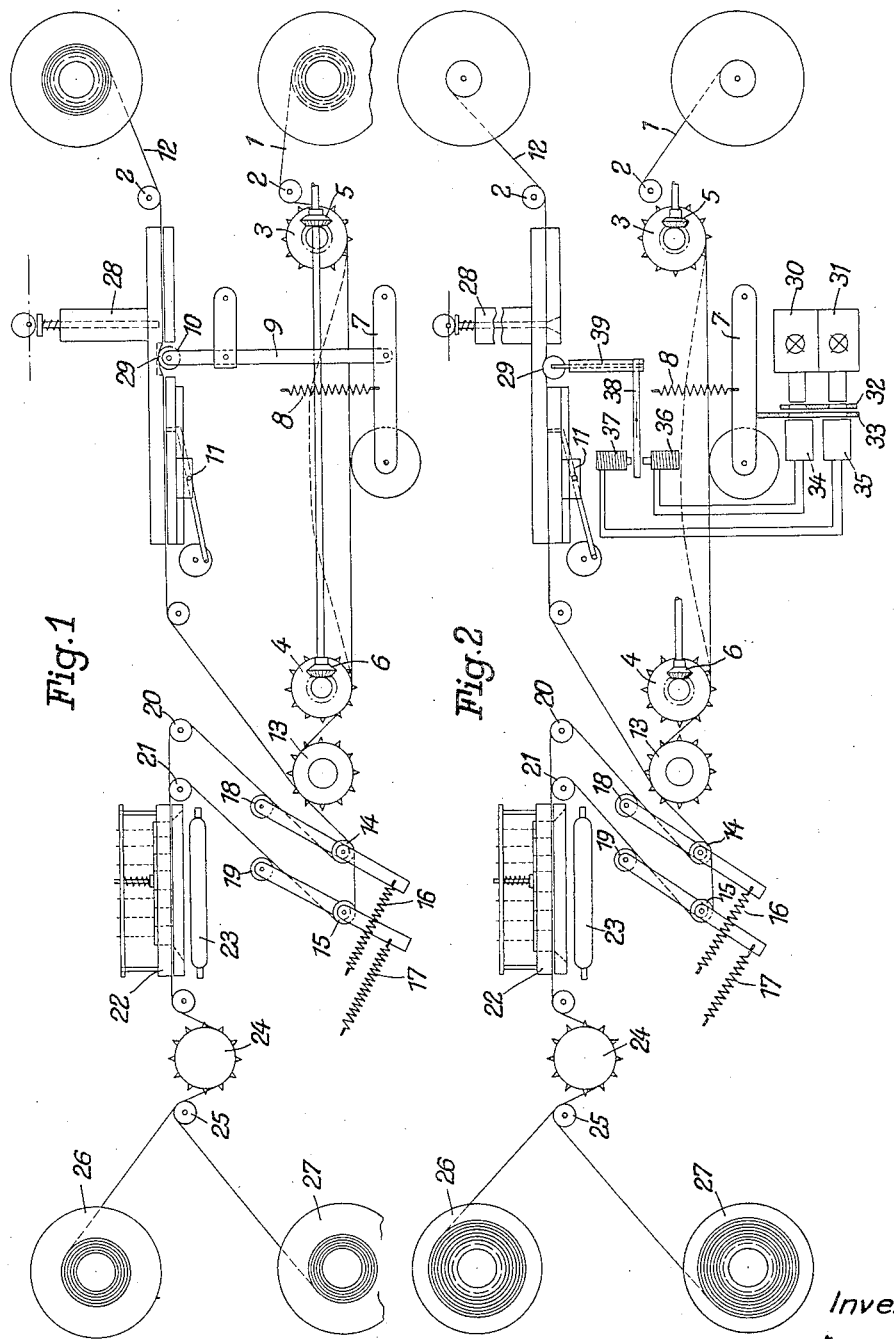

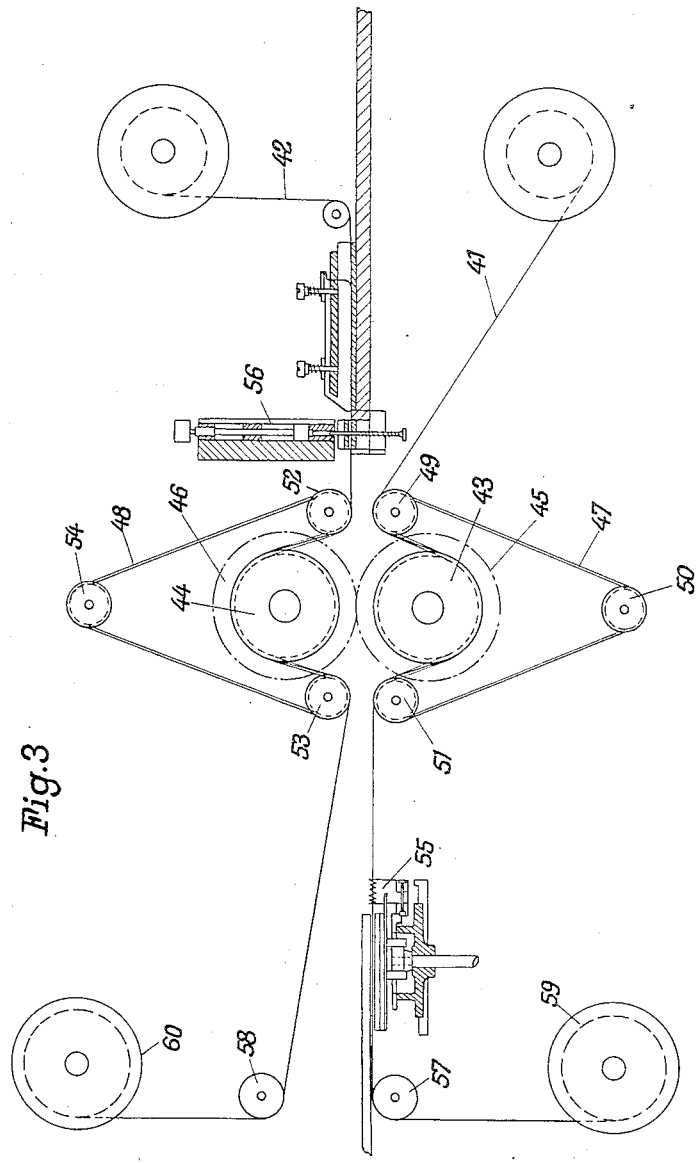

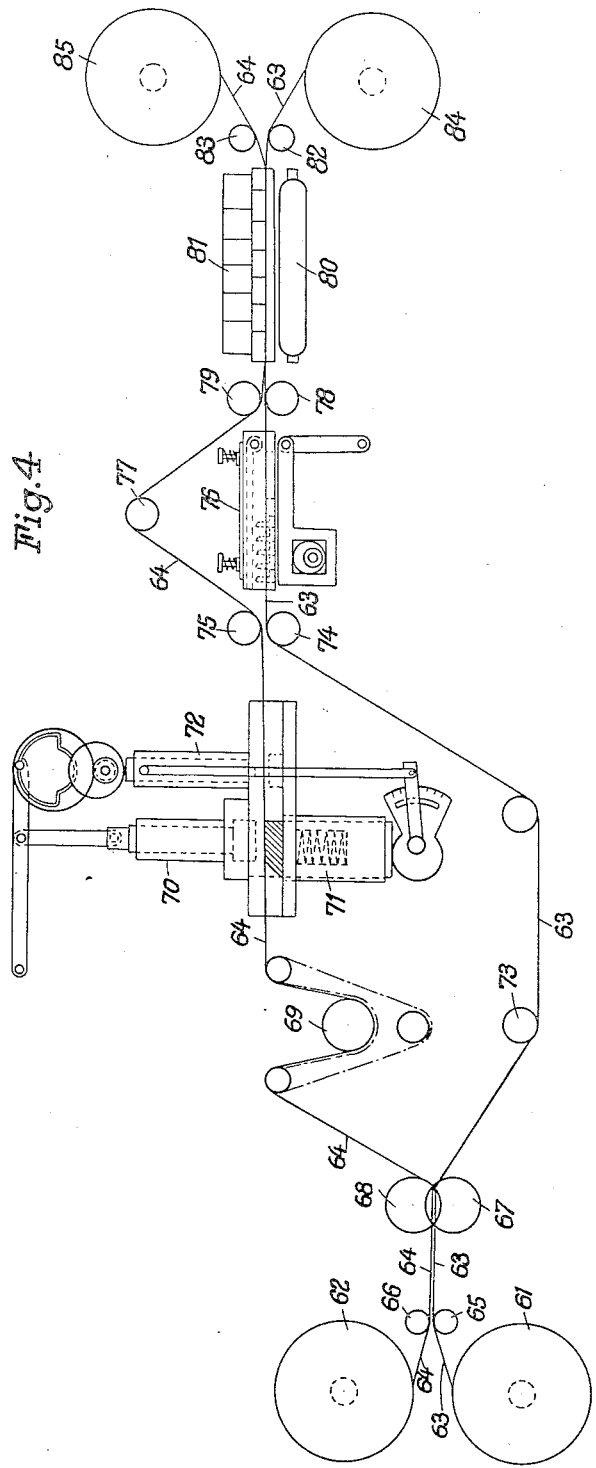

2,033,499

UNITED STATES PATENT OFFICE 2,033,499

FILM-COPYING APPARATUS

Karl Wahl, Berlin, Germany, assignor to the firm Sifico A. G., Schaffhausen, Switzerland Application June 1, 1934, Serial No. 728,612
In Germany June 17, 1933

6 Claims. (Cl. 164—114)

This invention relates to apparatus for copying films, and more particularly to an apparatus of that type in which a perforated negative film and a non-perforated positive film are conducted in common through an exposure gate and the positive film is furnished with a perforation. The positive film is passed through the exposure gate dependent on the movement of the negative film. In order in the case of lenticular screen films to avoid inexact registration of the screen caused by shrinkage of the material it has already been proposed to perform the perforation and embossing of the screen of the positive film and also the exposure thereof in one operation, and to control the perforation and embossing operation by the negative film.

Now it has been found in practice that even with the use of this method slight inexactitudes are not to be avoided with absolute certainty when stamping the positive film from one perforation to the other.

It is the object of the invention to obviate this drawback, and this is accomplished by the fact that between the negative film and the die or in front of the latter there is provided a control element, which is connected with the die so as to operate synchronously therewith.

Certain forms of embodiment of the apparatus according to the invention are illustrated by way of example in the accompanying drawings, in which Fig. 1 shows diagrammatically a copying apparatus having a mechanically operating control element.

Fig. 2 is a similar view of a copying apparatus, in which the control element is constructed in the form of a photoelectric cell.

Fig. 3 is a view of a copying device having a control element constituted by friction drums, whilst Fig. 4 is a view of a copying device having a control element constituted by friction rollers.

In the copying apparatus illustrated in Fig. 1 the negative film 1, taken from a reel, is conducted over synchronously running conveyor drums 3 and 4, which are so arranged that with a given number of perforation spacings a greatly shrunk film is moved in a straight line. Against the film 1 there thrusts a roller mounted on a lever 7. The spring 8 tends to press the roller on the oscillatory lever 7 continuously against the film. If now the spacing between one perforation and another of the film increases by a fraction of one-tenth of a millimetre, the film, as indicated by the broken line, is caused to bulge. This movement is all the more the greater the spacing between the perforations, and decreases as this spacing becomes smaller. The positive film 12 is advanced by the gripper system 11, and passes through the die 28. If now the length of film between the gripper device and the die varies, the spacing between the perforations in the positive film 12 becomes greater or smaller. This alteration is produced by the fact that the positive film 12 traverses a small, more or less curved path, which is indicated by the broken line 29. The lever 7 carrying the pressure roller is connected by a rod 9 with the roller 10 thrusting against the positive film 12. If the negative film 1 becomes longer, so that a bulge is accordingly produced, the positive film 12 is furnished with a correspondingly smaller bulge, resulting in conformity between the spacing of the perforations.

The levers as regards their length are selected to be in relation to each other. For varying the track of the positive film, however, it is also possible to employ in place of the lever a curve graduated so as to produce agreement between the two films.

The apparatus according to Fig. 2 operates in substantially the same fashion as that in Fig. 1. In this case, however, the bulge of the positive film 12 is not produced mechanically, but by means of two photo-cells 34 and 35. In this embodiment there is secured to the lever 7 a diaphragm 33 furnished with a recess or incision, behind which diaphragm there is located a permanent diaphragm 32 having two recesses. If the spacing between the perforations in the negative film becomes greater, there is in this case also produced a bulge, as in the embodiment previously described. The diaphragm 33 secured to the oscillatory lever 7 moves past the permanent diaphragm 32, and accordingly covers a part of the rays proceeding from the light sources 30, 31. The weakening of the light is converted into electric current impulses, which take effect in amplified fashion on the electro-magnets 36 and 37. In this manner the armature lever 38, 39 is attracted in the one or the other direction, resulting in a larger or smaller bulge in the positive film 12. With increased bulge the spacing is likewise varied between the die 28 and the gripper device 11, so that also in this case there is caused a variation in the spacing of the perforations.

In the forms of embodiment according to Figs. 1 and 2 the films pass over conveying drums 13 and rolls 14, 15, 20, 21 into the exposure gate 22 and are advanced by the conveying drum 24. Finally the films run over a guide roll 25 to winding reels 26 or 27.

When employing a plurality of exposure gates it is necessary for both films always to register in the same fashion, as otherwise errors in copying and lack of sharpness may occur. In order now to ensure that the perforations of both films move against the teeth on the drum 24, each film is tensioned by oscillatory levers, which are acted upon by springs 16 and 17 and carry rolls 18 and 19.

In the apparatus according to Fig. 3 the negative film 41 and the positive film 42 are conducted over friction drums 43 and 44. On the shafts of the latter there are mounted gear wheels 45 and 46 which, in similar fashion to the drums 43 and 44, possess equal diameters. About the drums 43 and 44 there are tensioned elastic bands 47 and 48, which run over guide rolls 49, 50 and 51 and 52, 53 and 54.

When the negative film 41 is advanced by the gripper device 55 the positive film 42, since the two drums 43 and 44 are coupled by the gear wheels 45 and 46, is also advanced by the same amount. The friction drums 43 and 44 are preferably furnished with a device for locking the same after the advance of the films in the thus determined position until the positive film 42 has been perforated by the die 56. The films 41, 42 are finally conducted over rolls 57 and 58 to winding reels 59 and 60.

According to Fig. 4 a perforated negative film 63 and a non-perforated positive film 64 are taken from reels 61 and 62. Both films are conducted in common through the medium of guide rolls 65, 66 to a cutting device 67, 68, which consists of two revolving knives, and by means of which there are trimmed the edges of the films 63 and 64 to obtain films of exactly equal width, so as to avoid a lateral lack of sharpness upon copying. The positive film 64 is then passed by a friction drive 69 to a device 70, 71 serving to produce a screen and to a die 72 forming the perforations, whilst the negative film 63 is advanced by a conveying drum 73. The two films 63 and 64 are moved together, after the embossing and perforation of the positive film 64, by a pair of friction rollers 74, 75, which are composed of rubber or other suitable material. A gripper device 76 located behind the rollers 74, 75 engages successively in each perforation in the negative film 63, so that this is always advanced to the extent of the spacing of two perforations. Due to the rollers 74, 75 acting in front of the gripper device 76 on both films 63 and 64, the positive film, upon each advance of the negative film 63, is also advanced to the same extent. The positive film 64 is run off over a guide roll 77. Behind the gripper device 76 there are situated a pair of guide rolls 78, 79, by means of which the two films 63 and 64 are again united, and one or more copying windows 81 exposed to lamps 80. The two films 63 and 64, after the copying process, pass over rolls 82 and 83 to the winding reels 84 and 85.

Measurements made in connection with films treated in the manner above described have shown that both films have practically equal spacing of the perforations, and that the greatest difference amounted to only .0002 mm. There is accordingly also obtained absolute sharpness in the height of the image, even in those cases in which the two films pass through a plurality of exposure windows or gates.

Behind the exposure gate 81 a conveying drum may conveniently be provided in order to draw the two films 63 and 64 through the gate.

It will be understood that no restriction is made to the specific forms of embodiment illustrated in the drawings, which have been quoted merely by way of example, and that numerous modifications are quite possible within the meaning of the above description and the annexed claims without departing from the spirit of the invention.

What I claim as new and desire to secure by Letters Patent is:

1. In an apparatus of the character described, means for feeding a perforated negative film, means for feeding a non-perforated positive film, means for perforating said positive film, and mechanical means directly in contact with the surface of said non-perforated film for varying the perforating of the positive film in dependence on the spacing of consecutive perforations in the negative film.

2. In an apparatus of the character described, synchronously operated driving elements for a perforated negative film, the slack in the portion of said negative film lying between said driving elements varying in dependence on irregularities of the spacing of the perforations therein, perforating means for a positive non-perforated film, and means for varying the distance between the perforations formed by said perforating means in dependence on the condition of the slack in the portion of the negative film intermediate said driving elements.

3. An apparatus as claimed in claim 2 characterized in that the last mentioned means includes a control device engaging said intermediate portion of the negative film and bearing against the positive film.

4. An apparatus as claimed in claim 2 characterized in that the last mentioned means includes a control device engaging said intermediate portion of the negative film and bearing against the positive film, and feed means for the positive film located behind said perforating means and said control device with respect to the direction of travel of the film.

5. An apparatus as claimed in claim 2 characterized in that the last mentioned means includes a control device engaging said intermediate portion of the negative film and bearing against the positive film, feed means for the positive film located behind said perforating means and said control device with respect to the direction of travel of the film, and drive means common to both of said films.

6. An apparatus as claimed in claim 2 characterized in that said last mentioned means includes a feed device for the positive film, a member engageable with the positive film intermediate the feed device and said perforating means, and means for actuating said film engaging member in dependence on the condition of slack in the portion of the negative film lying intermediate said drive elements.

KARL WAHL.